(12) United States Patent
Brudos et al.

(10) Patent No.: US 6,505,050 B1
(45) Date of Patent: Jan. 7, 2003

(54) METHOD AND APPARATUS FOR SUPPRESSING ROUTE REQUEST MESSAGES FOR WIRELESS GATEWAY APPLICATIONS

(75) Inventors: Phillip Gerald Brudos, Aurora, IL (US); Harold Robert Smith, Jr., Oakbrook Terrace, IL (US); Timothy Daniel Sullivan, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 90 days.

(21) Appl. No.: 09/689,552

(22) Filed: Oct. 12, 2000

(51) Int. Cl.[7] .................................................. H04Q 7/20
(52) U.S. Cl. ...................... 455/458; 455/45; 455/186.1; 455/3.04; 455/423; 455/432; 455/433; 455/455
(58) Field of Search ................................ 455/45, 186.1, 455/3.04, 458, 423, 432, 433, 455

(56) References Cited

U.S. PATENT DOCUMENTS 5,506,888 A * 4/1996 Hayes et al. ................. 455/413
5,839,072 A * 11/1998 Chien .......................... 455/432
6,304,753 B1 * 10/2001 Hartmaier .................... 370/338
6,307,929 B1 * 10/2001 Baiyor et al. ............. 379/207.1

FOREIGN PATENT DOCUMENTS

| WO | WO 97/23107 | 6/1997 |
| WO | WO 00/33600 | 6/2000 |

* cited by examiner

Primary Examiner—William Trost
Assistant Examiner—Danh C Le (57) ABSTRACT

Method and apparatus for suppressing route request messages for wireless gateway applications by establishing a relationship between a serving mobile switching center identifier and a facility identifier at a wireless gateway switch. The wireless gateway switch determines a corresponding facility to the serving mobile switch in order to establish an incoming call to a wireless subscriber unit. An exemplary embodiment exploits the present invention in a wireless system utilizing ANSI-41 messaging.

19 Claims, 7 Drawing Sheets

METHOD AND APPARATUS FOR SUPPRESSING ROUTE REQUEST MESSAGES FOR WIRELESS GATEWAY APPLICATIONS

FIELD OF THE INVENTION

The present invention relates to the field of wireless communications, and, more specifically, to supporting an incoming call through a wireless gateway switch destined for a mobile subscriber unit.

BACKGROUND OF THE INVENTION

Mobile wireless communications is rapidly becoming ubiquitous throughout the world. A major goal of all mobile wireless service providers is to provide seamless service so that wireless service, including incoming calls, is available to a mobile subscriber unit wherever it is currently located.

Because of this cooperation among service providers, a mobile subscriber unit can roam from a service area of a serving mobile switching center (MSC) to a service area of another MSC. To facilitate seamless roaming, the wireless system registers the location of the mobile subscriber unit as the mobile subscriber unit moves from place to place. Location information is typically stored in a home location register (HLR), which may be a stand-alone entity (stand-alone HLR) or may physically reside at a home MSC (integrated HLR). A "home MSC" for a mobile subscriber unit is the MSC that serves the location where the mobile subscriber unit is primarily located.

Figure 1:
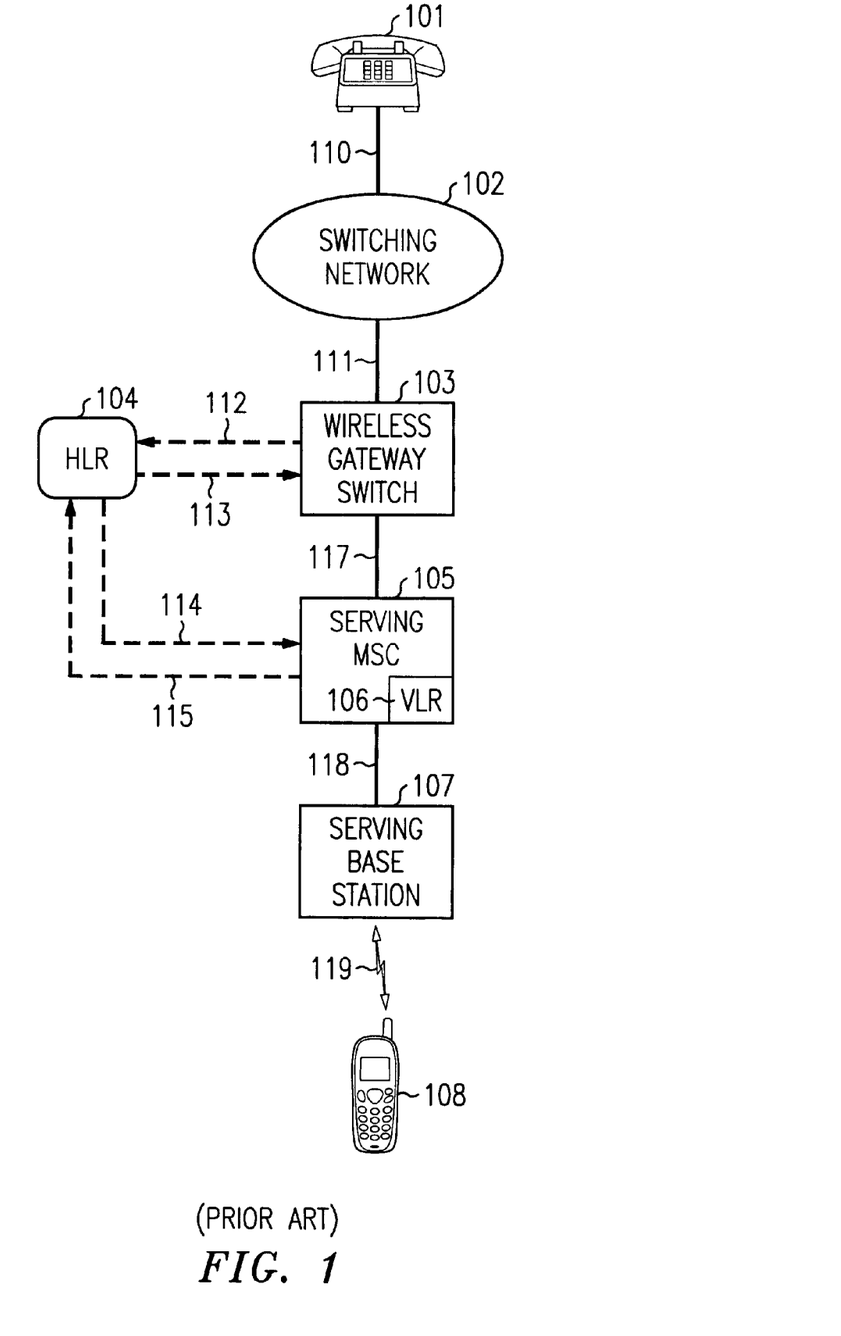
FIG. 1 shows an incoming call scenario in a wireless system that supports a roaming wireless subscriber unit according to prior art as exemplified by ANSI-41 messaging.

FIG. 1 illustrates an exemplary incoming call for a roaming wireless subscriber unit in wireless system according to the prior art ANSI-41 messaging. The incoming call is initiated when telephone 101 dials the directory number of wireless subscriber unit 108. The call is delivered to switching network 102 over facility 110. Switching network 102 directs the incoming call to wireless gateway switch 103 via facility 111. A "wireless gateway" switch is a portal or point of entry for calls from a public switch telephone network, such as 102, to a wireless network. Wireless gateway switch 103 determines where mobile subscriber unit 108 is located by requesting HLR 104 for the location of mobile subscriber unit 108. In order to do so, wireless gateway switch 103 sends a location request message 112 to HLR 104. Message 112 contains the directory number of mobile subscriber unit 108 (DGTSDIAL field in the message). HLR 104 maintains a record that includes the location of mobile subscriber unit 108, comprising the serving MSC 105 in which mobile subscriber unit 108 has last registered. A visiting location register (VLR) 106 record is maintained at serving MSC 105 while mobile subscriber 108 is located within the region served by MSC 105.

In response to message 112, HLR 104 sends a route request message 114 to the serving MSC (105 in this example) where the mobile subscriber unit last registered. Message 114 contains an IMSI field, which designates mobile subscriber unit 108. Serving MSC 105 responds to HLR 104 with route request return result message 115, which contains an MSCID field and TLDN field. MSCID field identifies serving MSC 105 and is represented as a 24-bit digital number (with 16 bits representing the system identification and 8 bits representing the switch number) in accordance with ANSI-41. TLDN field is a temporary local directory number that is subsequently utilized in the call scenario for delivering the incoming call to serving MSC 105. HLR 104 conveys the information received in message 115 by sending location request return result message 113 (including MSCID field and TLDN field) to wireless gateway switch 103.

Wireless gateway switch 103 delivers the incoming call to serving MSC 105, as identified by MSCID field, over facility 117 designating a telephone number according to TLDN field. Serving MSC 105 continues the delivery of the call to a serving base station, in this example base station 107, in which mobile subscriber unit 108 is located. Radio communications is established between serving base station 107 and mobile subscriber unit 108 over radio channel 119, thus completing the call between telephone 101 and mobile subscriber unit 108. Other standards, such as GSM mandate similar call setup message traffic.

With all the messages sent from place to place to establish each incoming call, message traffic on the wireless system (typically SS7 in North America) is increased and call capacity is decreased. Also, because messaging is increased on a per call basis, the inherent time delay associated with call setup for an incoming call is increased. Moreover, TLDNs (for a wireless system complying with ANSI-41) and MRNs (for a wireless system complying with GSM-MAP) are required for completing the incoming call. If the number of TLDNs or MRNs that are assigned to a serving MSC is exhausted, the serving MSC cannot accept incoming calls until a TLDN or an MRN is relinquished from a previously established incoming call. In such a case, the service provider must either accept call blockage that is associated with the limited pool of TLDNs or MRNs or increase the size of the TLDN pool or MRN pool of the serving MSC's. TLDNs and MRNs are typically valid telephone numbers that can be otherwise assigned to a local revenue producing mobile subscriber unit.

SUMMARY OF THE INVENTION

The present invention effects an economical call setup to a mobile subscriber unit located within a gateway cluster. The gateway cluster comprises a wireless gateway switch and at least one MSC. The wireless gateway switch identifies a facility to a serving MSC from a new data structure according to the present invention. If the serving MSC is not in the gateway cluster, a facility to the serving MSC is identified by a method or apparatus according to prior art.

The present invention obviates a route request message between an HLR and a serving MSC including the temporary telephone number. A wireless gateway switch queries the HLR about the location of the mobile subscriber unit. The wireless gateway switch chooses a facility to the serving MSC according to a relationship between the serving MSC identifier (MSCID) that is provided by the HLR and a facility identifier. The wireless gateway switch utilizes a data structure in order to determine the facility identifier. In an exemplary example of the present invention, the facility identifier comprises a trunk group number.

Moreover, the present invention may be extended to call scenarios in which secondary call treatment is provided. The invention supports provisioning either the HLR or the wireless gateway switch with an indicator associated with each serving MSC of the gateway cluster. The indicator signifies whether the serving MSC is within the gateway cluster. The HLR utilizes the indicator to determine whether to generate a route request message to the serving MSC according to prior art or to suppress the route request message according to the present invention.

The exemplary embodiment exploits the present invention in a wireless invention utilizing ANSI-41 messaging and can be extended to GSM-MAP messaging. The exemplary embodiment supports incoming calls to the mobile subscriber unit and may result in providing secondary call treatment if the mobile subscriber unit does not respond to paging. The conservation of assignable telephone numbers allows for an increased number of mobile subscriber units that can be supported in a wireless system. Obviating the necessity of the two messages for an incoming call ameliorates the limitations imposed by the factors discussed heretofore.

DETAILED DESCRIPTION

Figure 2:
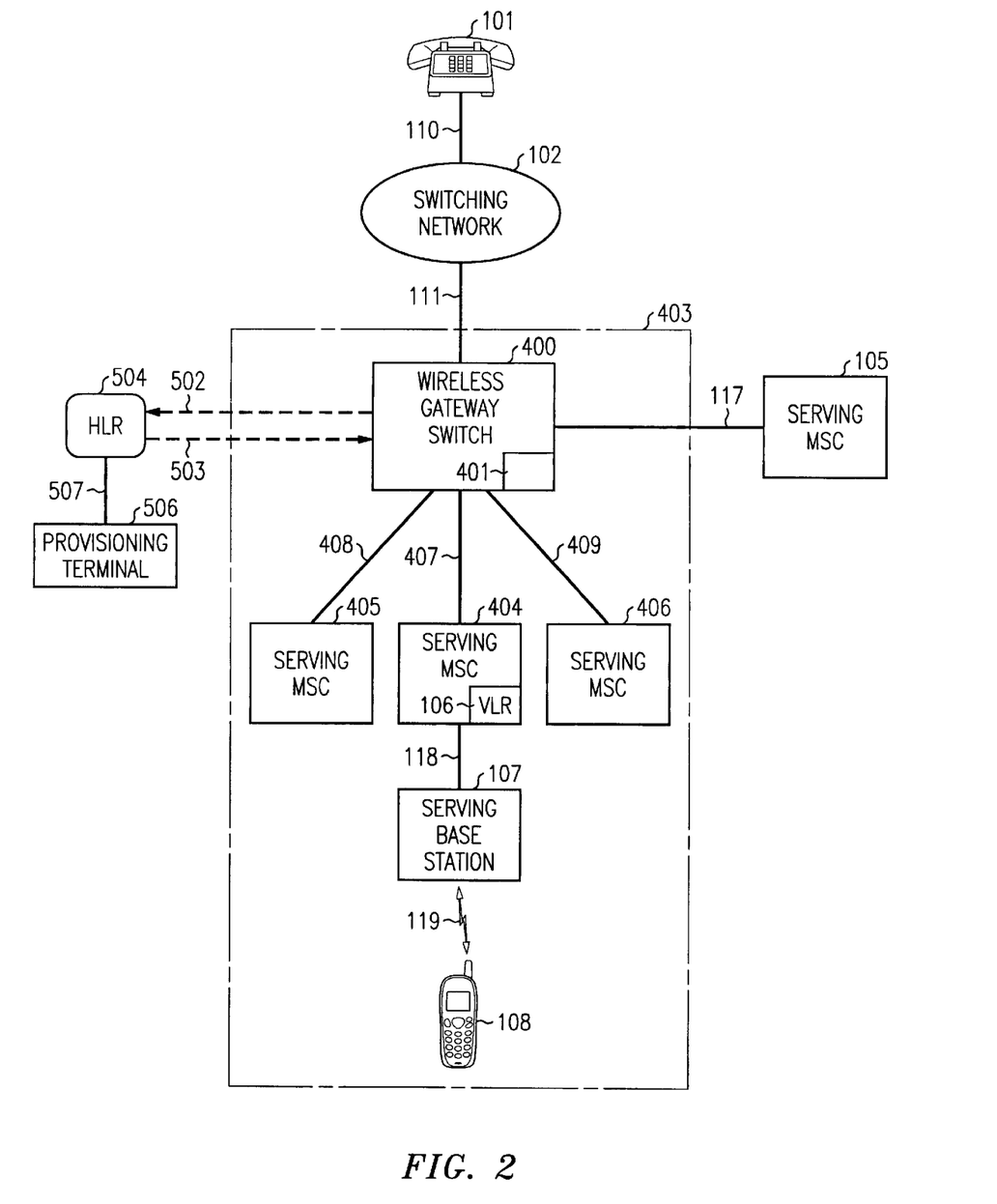
FIG. 2 shows an incoming call scenario in a wireless system that supports a roaming mobile subscriber unit according to the present invention.

FIG. 2 illustrates a wireless system according to the present invention. Gateway cluster 403 comprises wireless gateway switch 400, serving MSC 404, serving MSC 405 and serving MSC 406. (In the disclosure, a "gateway cluster" comprises a wireless gateway switch and at least one serving MSC in which a facility to a serving MSC from the wireless gateway switch is identified by a data structure, e.g., data structure 401, according to the present invention. Wireless gateway switch 400 establishes an incoming call from telephone 101 to serving MSC 404, serving MSC 405, serving MSC 406 or serving MSC 105 depending on the location of mobile subscriber unit 108. If mobile subscriber unit 108 is located within the region served by serving MSC 404, serving MSC 405 or serving MSC 406, wireless gateway switch 400 utilizes data structure 401 as described further, below, in connection with FIG. 3. However, mobile subscriber unit 108 may be located outside the region served by gateway cluster 403. For example, if mobile subscriber unit 408 is located within a region served by serving MSC 105, wireless gateway switch 400 establishes the incoming call to serving MSC 105 over facility 117 utilizing a TLDN or MRN as described in relation to FIG. 1.

As in FIG. 1, an incoming call is initiated by telephone 101 to switching network 102 over facility 110 by dialing the directory number of mobile subscriber unit 108. Switching network 102 directs the incoming call to wireless gateway switch 400 through facility 111. Wireless gateway switch 400 determines that mobile subscriber unit 108 is located within the region served by serving MSC 404 by sending a location request message 502 to HLR 504. Message 502 contains DGTSDIAL field, which is the directory number of mobile subscriber unit 108. HLR 504 determines that mobile subscriber unit 108 was last located in the region served by MSC 404 in which mobile subscriber unit 108 last regis-tered. If MSC 404 is contained in gateway cluster 403, HLR 504 does not request a temporary local directory number from serving MSC 404. In the exemplary embodiment, an indicator, which is an entry in a database, is provisioned at HLR 504 for each serving MSC to specify if the serving MSC is contained in gateway cluster 403. The indicator is determined according to whether wireless gateway switch 400 shall select facility 407 by utilizing data structure 401. Data structure 401 is discussed in the subsequent discussion of FIG. 6. Otherwise, wireless gateway switch 400 utilizes a TLDN to connect the incoming call as described previously in connection with FIG. 1.

A gateway cluster (e.g. gateway cluster 403) can be configured so that a mobile to mobile call (in which a second mobile subscriber unit within the gateway cluster calls a first mobile subscriber unit also within the gateway cluster) is processed as an incoming call according to the present invention. For example, the serving MSC (e.g. serving MSC 404) routes the call to the wireless gateway switch (e.g. wireless gateway switch 400) through a loop-around facility (as is known in the art) so that the call from the second mobile subscriber unit appears as an incoming call to the first mobile subscriber unit.

In the exemplary embodiment, an indicator is provisioned at HLR 504 for each serving MSC. A technician provisions each indicator by inputting commands to terminal 506 through interface 507. Alternative embodiments can implement the indicators at serving gateway switch 400 as can be appreciated by one skilled in the art. HLR 504 responds with location request return result message 503, which contains an MSCID field and RoutingDigits field. HLR 504 determines a value for RoutingDigits field according to the corresponding indicator.

Figure 3:
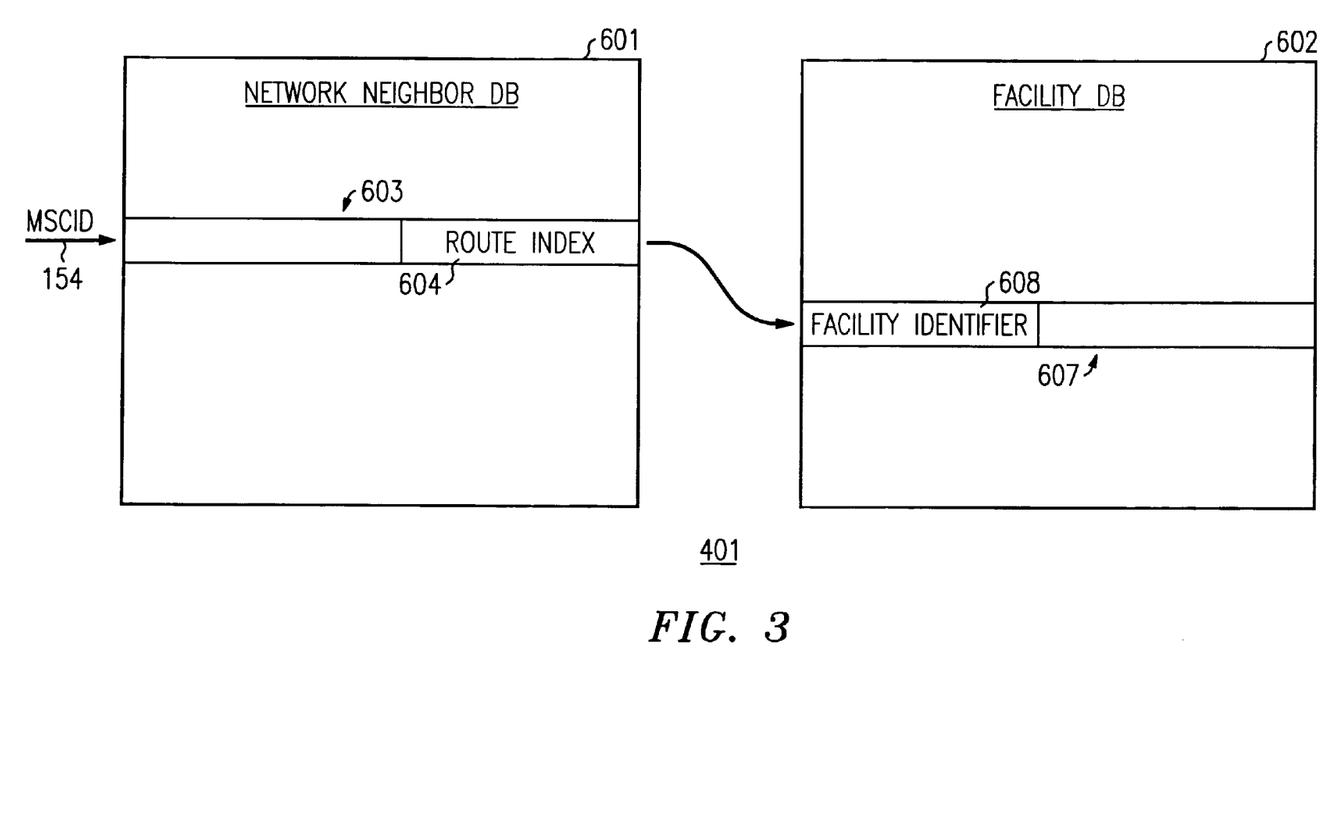
FIG. 3 illustrates a data structure utilized for delivering an incoming call to a serving MSC according to the present invention.

FIG. 3 illustrates data structure 401 that is utilized by wireless gateway switch 400 for delivering the incoming call to serving MSC 404 according to the present invention. MSCID, as contained in MSCID field 154, is used by wireless gateway switch 400 as an index to network neighbor database 601 to fetch corresponding database entry 603. Database entry 603 comprises route index 604.

Route index 604 is used as an index to facility database 602 to fetch corresponding database entry 607. Database entry 607 comprises facility identifier 608. In the exemplary embodiment, facility identifier 601 comprises a trunk group number from which wireless gateway switch 400 chooses a trunk member number. Wireless gateway switch 400 establishes the incoming call over facility 407 corresponding to the trunk group number and trunk member number. As appreciated by one skilled in the art, alternative embodiments can implement facility identifier 601 as directly identifying both the trunk group number and trunk member number, however.

Figure 4:
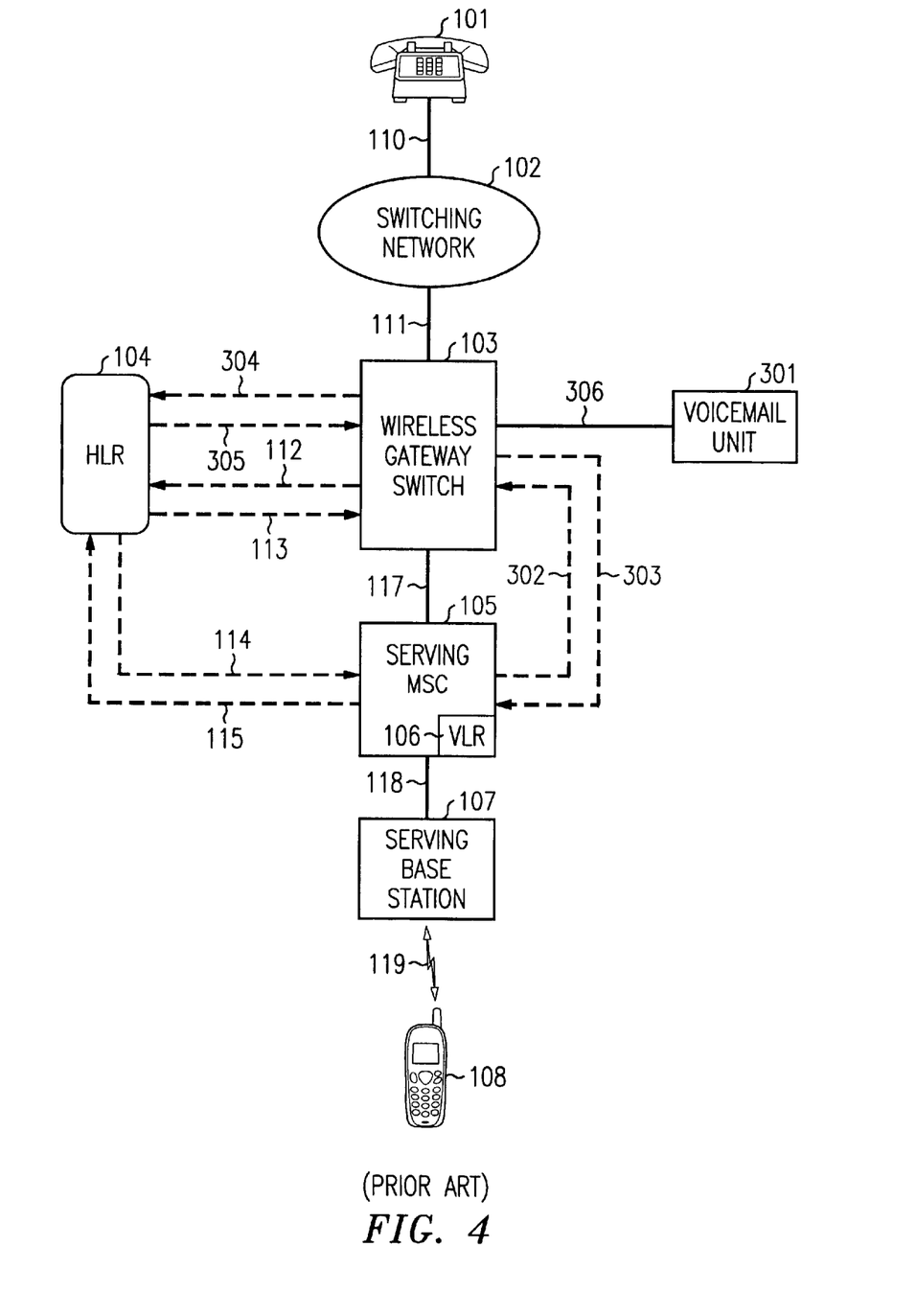
FIG. 4 shows an incoming call scenario with secondary call treatment in a wireless system that supports a roaming mobile subscriber unit according to prior art as exemplified by ANSI-41 messaging.

FIG. 4 illustrates a prior art incoming call scenario as in FIG. 1, except that mobile subscriber unit 108 is not available and subsequent secondary call treatment is determined. As in FIG. 1, the incoming call is delivered to serving MSC 105 over facility 117. However, mobile subscriber unit 108 is currently communicating on another call to serving base station 107 over radio link 119. Other examples include call scenarios in which mobile subscriber unit 108 is powered down and mobile subscriber unit 108 is not responding to paging messages because of poor coverage of the RF channel. If mobile subscriber unit 108 is unavailable, serving MSC 105 sends redirection request message 302 with redirection reason field, which indicates the reason for mobile subscriber unit 108 not being available to wireless gateway switch 103. Wireless gateway switch 103 consequently sends transfer to number request message 304 with an IMSI field. The IMSI field identifies mobile subscriber unit 108 to HLR 104. HLR 104 responds with transfer to number request return result message 350 containing transfer DN field, which designates the directory number of voicemail unit 301. Consequently, wireless gateway switch 103 redirects the incoming call from facility 111 to voicemail unit 301 through facility 306.

In the call scenario shown in FIG. 4, the secondary treatment is to redirect the incoming call to voicemail unit 301; however, alternative types of secondary call treatment include redirecting the incoming call to an announcement or to another mobile subscriber unit.

Figure 5:
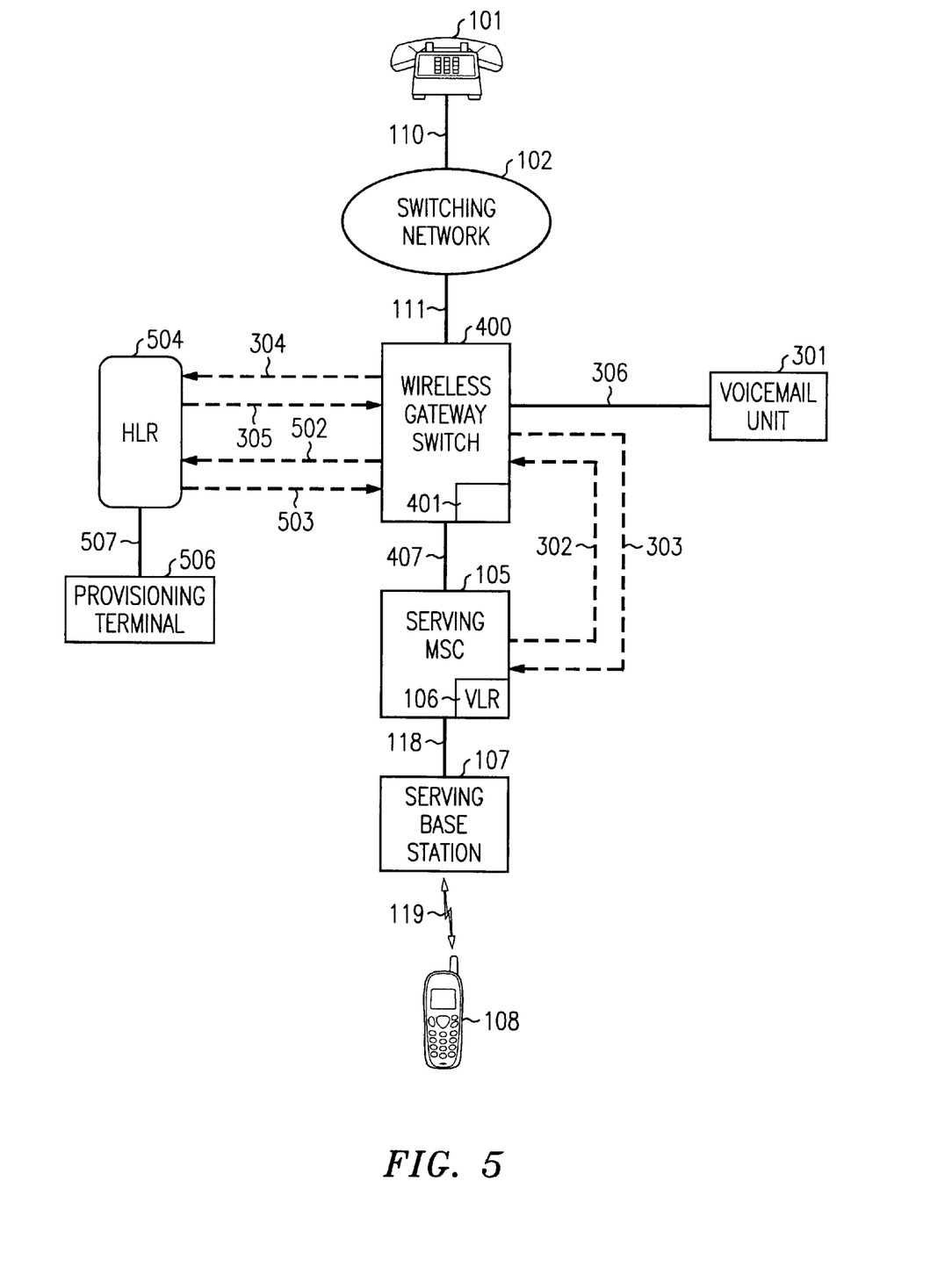
FIG. 5 shows an incoming call scenario with secondary call treatment in a wireless system that supports a roaming mobile subscriber unit according to the present invention.

FIG. 5 shows an incoming call scenario with secondary treatment to mobile subscriber unit 108 in a wireless system according to the present invention. The call scenario in FIG. 5 is similar to the call scenario in FIG. 2 except that mobile subscriber unit 108 is not available. When wireless gateway switch 400 determines that mobile subscriber unit 108 is not available, the call scenario in FIG. 5 proceeds as in FIG. 2 to determine the secondary call treatment.

Figure 6:
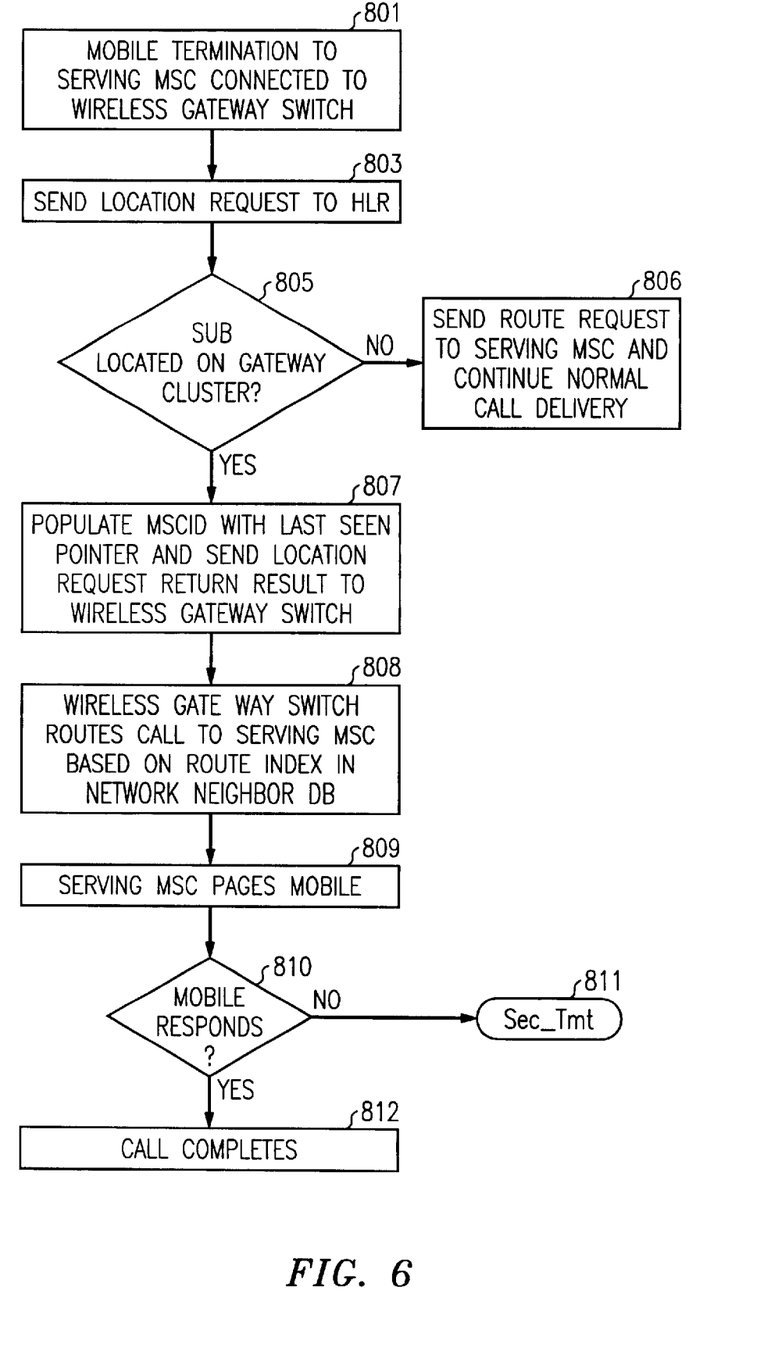
FIG. 6 illustrates a flow diagram for the call scenario in FIG. 2.

FIG. 6 illustrates a flow diagram for the call scenario shown in FIG. 5. In step 801, the incoming call is connected to wireless gateway switch 400. Wireless gateway switch 400 sends location request message 502 to HLR 404 in step 803. In step 805, if mobile subscriber unit 108 is located in the region served by gateway cluster 403, step 807 is executed. If mobile subscriber unit 108 is not located in gateway cluster 403, HLR 504 sends route request message 114 to serving MSC 105 as shown in FIG. 1. In such a case, wireless gateway switch 400 utilizes a TLDN to route the incoming call to serving MSC 105 as shown in FIG. 1.

In step 807, HLR 504 responds with location request return result message 503 to wireless gateway switch 400 with MSCID field 154, instructing wireless gateway switch 400 to utilize data structure 401 to route the incoming call. In step 808, wireless gateway switch 400 determines facility identifier 608 from MSCID field 154. In step 809, serving MSC 404 pages mobile subscriber unit 108. If mobile subscriber unit 108 responds, the incoming call is completed in step 812. If mobile subscriber unit 108 does not respond to the page, step 811 is executed and secondary call treatment is determined according to the call flow in FIG. 7.

Figure 7:
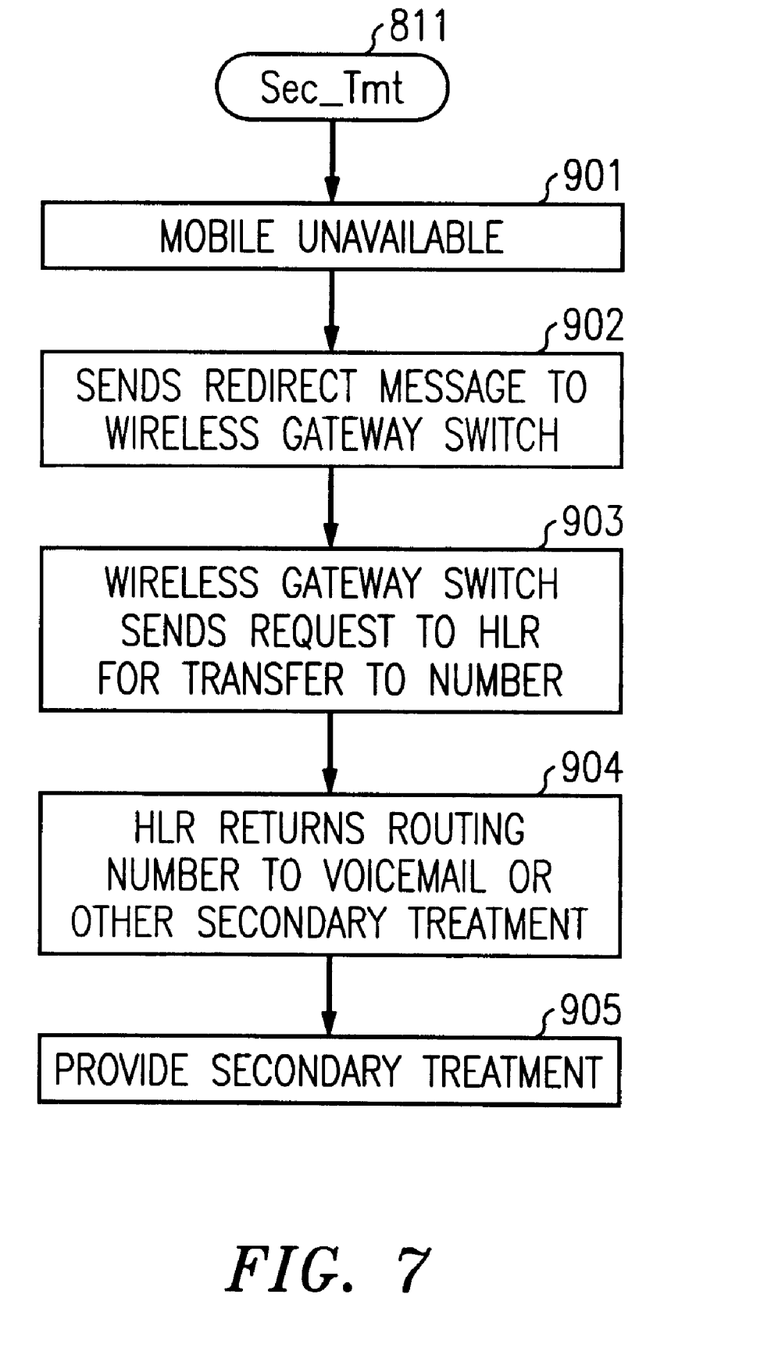
FIG. 7 illustrates a flow diagram for secondary call treatment for the call scenario in FIG. 5.

FIG. 7 illustrates a flow diagram for secondary treatment for the call scenario shown in FIG. 5. In step 901, serving MSC 105 determines that mobile subscriber unit 108 is not available. Consequently, serving MSC 105 sends redirection request message 302 to wireless gateway switch 400. In step 903, wireless gateway switch 400 sends transfer to number request message 304 to fTLR 504. In step 904, 1LR 504 responds with transfer to number request return result message 305 with the routing number of voicemail unit 301. In step 905, secondary call treatment is provided. With the example shown in FIG. 5, secondary call treatment is provided by voicemail unit 301 although other types of secondary treatment (e.g., an announcement) can be provided.

It is to be understood that the above-described embodiment is merely an illustrative principle of the invention and that many variations may be devised by those skilled in the art without departing from the scope of the invention. It is, therefore, intended that such variations be included with the scope of the claims.

What is claimed is:

1. A method for establishing an incoming call into a wireless system, said incoming call requested by a telephone to a first mobile subscriber unit through a switching network, said method comprising the steps of:

routing said incoming call to a wireless gateway switch from said switching network;

sending a location request message by said wireless gateway switch to a home location register (HLR);

returning a location request return result message to said wireless gateway switch by said HLR responsive to receiving said location request message, said location request return result message comprising a last-seen pointer identifying a serving mobile switching center (MSC) within a gateway cluster of the wireless gateway switch;

selecting a facility between said wireless gateway switch and the serving MSC;

delivering over said facility said incoming call from said wireless gateway switch to said serving MSC without designating a routing number assigned to the mobile subscriber unit by the serving MSC.

2. The method of claim 1, wherein said step of selecting said facility comprises:

obtaining a route index from a network database by said wireless gateway switch; and accessing a facility identifier from a facility database according to said route index.

3. The method of claim 1, said method further comprising the steps of:

determining whether said first mobile subscriber unit is not available by said serving MSC;

notifying said wireless gateway switch to redirect said call by said serving MSC responsive to said step of determining whether said first mobile subscriber unit is not available;

requesting a transfer number from said HLR by said wireless gateway switch responsive to said step of notifying said wireless gateway switch;

returning said transfer number from said HLR to said wireless gateway switch responsive to said step of requesting said transfer number;

routing said incoming call to a secondary call treatment by said wireless gateway switch responsive to said step of returning said transfer number from said HLR.

4. The method of claim 1, wherein said telephone is selected from the group consisting of a second mobile subscriber unit, a fixed wireless subscriber unit, and a land-based telephone instrument.

5. The method of claim 1, wherein said switching network is selected from the group consisting of a public switching telephone network (PSTN), an asynchronous transfer mode (ATM) network, an Intranet, and an Internet.

6. The method of claim 1, wherein said incoming call is selected from the group consisting of a voice call, a data call, and a multimedia call.

7. The method of claim 1, wherein said wireless gateway switch's standards compatibility is selected from the group consisting of ANSI IS-41 and GSM-MAP.

8. The method of claim 1, wherein said HLR is selected from the group consisting of a stand-alone HLR and an integrated HLR.

9. The method of claim 1, wherein said facility is selected from the group consisting of an asynchronous transfer mode facility, an TCP/IP facility, and a public switching telephone (PSTN) facility.

10. A method for establishing an incoming call into a wireless system, said incoming call requested by a telephone to a first mobile subscriber unit through a switching network, said method comprising the steps of:

routing said incoming call to a wireless gateway switch from said switching network;

sending a location request message by said wireless gateway switch to a home location register (HLR);

returning a location request return result message to said wireless gateway switch by said HLR responsive to receiving said location request message, said location request return result message comprising a last-seen pointer and a field in accordance with an indicator entered through a provisioning terminal over an interface between said provisioning terminal and said HLR, said indicator corresponding to a serving MSC, said first mobile subscriber unit's location being within a region served by said serving MSC, said serving MSC corresponding to said last-seen pointer;

interpreting said field by said wireless gateway switch to select a facility between said wireless gateway switch and said serving mobile switching center (MSC); and delivering over said facility said incoming call from said wireless gateway switch to said serving MSC.

11. The method of claim 10, wherein said field is contained in a MSCID parameter, said MSCID parameter is contained in a message in accordance with ANSI-41.

12. A wireless system establishing an incoming call, said incoming call requested by a telephone to a mobile subscriber unit through a switching network, said wireless system comprising:

means for routing said incoming call to a wireless gateway switch from said switching network;

means for sending a location request message to a home location register (HLR) by said wireless gateway switch;

means for returning a location request return result message to said wireless gateway switch by said HLR in response to receiving said location request message, said location request return result message comprising a last-seen pointer identifying a serving mobile switching center (MSC) within a gateway cluster of the wireless gateway switch;

means for selecting a facility between said wireless gateway switch and the serving MSC; and means for delivering over said facility said incoming call from said wireless gateway switch to said serving MSC without designating a routing number assigned to the mobile subscriber unit by the serving MSC.

13. The wireless system of claim 12, wherein said means of selecting said facility comprises:

means for obtaining a route index from a network database by said wireless gateway switch according to said last-seen pointer; and means for accessing a facility identifier from a facility database according to said route index.

14. The wireless system of claim 12, further comprising:

means for determining whether said mobile subscriber unit is not available by said serving MSC;

means for notifying said wireless gateway switch to redirect said incoming call by said serving MSC in response to said means of determining whether said mobile subscriber unit is not available;

means for requesting a transfer number from said HLR by said wireless gateway switch in response to said means of notifying said wireless gateway switch;

means for returning said transfer number from said HLR to said wireless gateway switch in response to said means of requesting said transfer number;

means for routing said incoming call to a secondary call treatment by said wireless gateway switch in response to said means of returning said transfer number from said HLR.

15. A wireless system establishing an incoming call, said incoming call requested by a telephone to a mobile subscriber unit through a switching network, said wireless system comprising:

means for routing said incoming call to a wireless gateway switch by said switching network;

means for sending a location request message to a home location register (HLR) by said wireless gateway switch;

means for returning a location request return result message to said wireless gateway switch by said HLR in response to receiving said location request message, said location request return result message comprising a last-seen pointer and a field in accordance with an indicator entered through a provisioning terminal over an interface between said provisioning terminal and said HLR, said indicator corresponding to a serving MSC, said first mobile subscriber unit's location being within a region served by said serving MSC;

means for interpreting said field by said wireless gateway switch to select a facility between said wireless gateway switch and said serving mobile switching center (MSC); and means for delivering said incoming call from said wireless gateway switch to said serving MSC.

16. In a wireless communication system wherein an incoming call to a mobile subscriber unit is established via a wireless gateway switch, a method comprising the wireless gateway switch performing steps of:

sending a location request message to a home location register (HLR);

receiving a location request return result message from the HLR, the location request return result message including a first field identifying a serving mobile switching center (MSC) and a second field indicating the serving MSC is within a gateway cluster associated with the wireless gateway switch;

interpreting the second field to determine the incoming call may be routed to the serving MSC without relying on a routing number assigned to the mobile subscriber unit by the serving MSC;

selecting a facility for routing the incoming call from the wireless gateway switch to the serving MSC; and delivering the incoming call to the serving MSC over said facility without designating a routing number assigned to the mobile subscriber unit by the serving MSC.

17. The method of claim 16, wherein the first and second field of the location request return result message comprise, respectively, an MSCID field and a Routing Digits field.

18. The method of claim 16, wherein the wireless communication system supports ANSI-41 messaging, the method obviating reliance by the wireless gateway switch on a temporary location directory number (TLDN) assigned to the mobile subscriber unit by the serving MSC.

19. The method of claim 16, wherein the wireless communication system supports GSM-MAP messaging, the method obviating reliance by the wireless gateway switch on a MRN assigned to the mobile subscriber unit by the serving MSC.

* * * * *